(12) United States Patent
Kajikawa et al.

(10) Patent No.: US 6,358,628 B1
(45) Date of Patent: Mar. 19, 2002

(54) SLIDE MEMBER MADE OF AN ALUMINUM ALLOY

(75) Inventors: Yoshiaki Kajikawa, Aichi-ken; Shinji Kato, Okazaki; Tetsuya Suganuma, Nagoya; Kaneo Hamajima, Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 08/220,707

(22) Filed: Mar. 31, 1994

(30) Foreign Application Priority Data

May 13, 1993 (JP) .............................. 5-135477

(51) Int. Cl.[7] ...................... C22C 49/06; C22C 101/04; C22C 101/06
(52) U.S. Cl. ....................................... 428/614; 428/610
(58) Field of Search ................... 428/614, 610

(56) References Cited

U.S. PATENT DOCUMENTS

| | | | | |
|---|---|---|---|---|
| 4,152,149 A | * | 5/1979 | Horikiri et al. | 428/614 |
| 4,457,979 A | * | 7/1984 | Donomoto et al. | 428/614 |
| 4,590,132 A | | 5/1986 | Dohnomoto et al. | 428/614 |
| 4,595,638 A | | 6/1986 | Dohnomoto et al. | 428/614 |
| 4,696,866 A | * | 9/1987 | Tanaka et al. | 428/614 |
| 4,757,790 A | | 7/1988 | Ushio et al. | 428/614 |
| 4,777,097 A | * | 10/1988 | Kubo et al. | 428/614 |
| 5,131,356 A | | 7/1992 | Sick et al. | 428/614 |
| 5,175,133 A | * | 12/1992 | Smith et al. | 501/127 |

FOREIGN PATENT DOCUMENTS

| | | |
|---|---|---|
| EP | 0 213 528 | 3/1987 |
| JP | 58-93839 | * 6/1983 |
| JP | 58-93840 | * 6/1983 |
| JP | 60 106942 | 6/1985 |
| JP | 61 194132 | 8/1986 |
| JP | 62 139840 | 6/1987 |
| JP | 62 139841 | 6/1987 |
| JP | 62 297427 | 12/1987 |
| JP | 64 17831 | 1/1989 |
| JP | 3 71939 | 11/1991 |

OTHER PUBLICATIONS

"Handbook of Chemistry and Physics", 54th edition, QD 65. (Apr. 1973), pp. B–64.*
Mellor, "Inorganic and Theoretical Chemistry", vol. VI, QD 31. M4, 1947, pp. 453–455.*
Chemical Abstracts, vol. 103, No. 26, Dec. 30, 1985, AN 219592y, JP–A–60 106 942, Jun. 12, 1985.

* cited by examiner

Primary Examiner—Ngoc-Yen Nguyen
(74) Attorney, Agent, or Firm—Oblon, Spivak, McClelland, Maier & Neustadt, P.C.

(57) ABSTRACT

A slide member is made of an aluminum alloy and compositely reinforced at its sliding surface by a reinforcing material. The reinforcing material is a mixture of alumina short fibers consisting of not less than 80 wt. % alumina and the remainder silica and having 5–60 wt. % alpha alumina content, and non-spherical mullite particles consisting of 40–86 wt. % alumina and the remainder silica and having 3–60 microns mean diameter. The volumetric percentages of the alumina short fibers and the mullite particles are 2–12% and 5–25%, respectively, on the basis of the volume of the reinforced portion.

2 Claims, 6 Drawing Sheets

(x140)

SLIDE MEMBER MADE OF AN ALUMINUM ALLOY

BACKGROUND OF THE INVENTION

1. Field of the Invention

The present invention relates to a slide member made of an aluminum alloy, and more particularly, to a slide member made of an aluminum alloy and compositely reinforced at a sliding surface portion thereof by a reinforcing material.

2. Prior Art

One of such slide members made of an aluminum alloy and compositely reinforced at a sliding surface portion thereof by a reinforcing material is known from, for example, Japanese Patent Publication 3-71939 (1991), to comprise a reinforcing material made of a mixture of 8–20 vol. % alumina short fibers and 3–12 vol. % carbon fibers. In such a slide member, the combination of the alumina short fibers having a high hardness and the carbon fibers having a self-wettability furnishes the sliding surface portion of the slide member with an improved anti-wearing performance as compared with a slide member comprising a reinforcing material made of only the alumina short fibers.

However, the alumina short fibers and the carbon fibers are both relatively expensive, and therefore, the slide member reinforced by the combination of these fiber materials is expensive. Further, such a relatively high volumetric percentage of the hard alumina short fibers as 8–20 tends to increase the wearing of a mating member which slides against the slide member. Therefore, such a known slide member is not always most desirable for various purposes.

SUMMARY OF THE INVENTION

In view of the above-mentioned problems with respect to the prior art aluminum alloy slide member, it is an object of the present invention to provide a less expensive, high performance aluminum alloy slide member which is not only superior in the anti-wearing resistance of itself but also less abrasive against a mating member.

According to the present invention, the above-mentioned object is accomplished by a slide member made of an aluminum alloy and compositely reinforced at a sliding surface portion thereof by a reinforcing material, wherein said reinforcing material comprises a mixture of alumina short fibers consisting of not less than 80 wt. % alumina and the remainder silica and having 5–60 wt. % alpha alumina content, and non-spherical mullite particles consisting of 40–86 wt. % alumina and the remainder silica and having 3–60 microns mean diameter, the volumetric percentages of said alumina short fibers and said non-spherical mullite particles being 2–12% and 5–25%, respectively, on the basis of the volume of the reinforced portion.

According to the above-mentioned construction, the alumina short fibers having a high hardness provided by not less than 80 wt. % alumina with the alpha alumina content in a range of 5–60 wt. %, and the mullite particles of 3–60 microns mean diameter consisting of 40–86 wt. % alumina and the remainder silica, provide, in combination, and based upon such volumetric percentages as 2–12 and 5–25, respectively, an appropriately high hardness of the slide member itself, without increasing the wearing of a mating member, and further, since the non-spherical mullite particles are firmly held in the aluminum alloy matrix, a further improved anti-wearing performance of the slide member is available, together with an improvement of the wearing performance of a mating member, as compared with the prior art in which the reinforcing material is a combination of the alumina short fibers and the carbon fibers, as will be appreciated from the detailed descriptions made hereinbelow.

Further, according to the above-mentioned construction, since the content of the relatively expensive alumina short fibers is limited to be within a relatively low range such as 2–12 vol. %, while since the non-spherical mullite particles are less expensive than the carbon fibers, the slide member can be manufactured at a lower cost than the above-mentioned prior art slide member.

Further, when the total volumetric percentage of the alumina short fibers and the non-spherical mullite particles is made to be not less than 9%, not only the anti-wearing performance of the slide member and the wearing performance of a mating member are improved, but also the anti-scuffing performance of the slide member is improved, as described in detail hereinbelow.

As is well known in the art, the alumina-silica fibers are classified into alumina fibers, alumina-silica fibers and glass fibers according to the content of alumina, and although the borders between them are not very definite, it is generally admitted in this art that the alumina short fibers are alumina-silica fibers containing not less than 80 wt. % alumina. The condition "not less than 80 wt. % alumina" referred to in the present specification with respect to the alumina short fibers means that the alumina short fibers in the present invention contains 80 wt. % or more alumina as is generally admitted in this art.

The crystal of mullite is rhombic, and particularly a needle crystal. Therefore, when the mullite is mechanically pulverized, the needle crystal is torn off at a middle portion of its elongated shape, to produce irregular pieces having sharp edges quite different from the spherical or an ovally spherical shape of the particles produced by the atomization method or the like. The expression "non-spherical mullite particles" in the present specification refers to such angularly edged pieces each having at least one mechanically torn off surface, different from the spherical or ovally spherical particles.

Further, as is well known in the art, the theoretical composition of the mullite is 71.8 wt. % $Al_2O_3$—28.2 wt. % $SiO_2$ ($3Al_2O_3.2SiO_2$), and when the composition of the mullite particles deviates from such a theoretical composition, alumina crystals and/or silica crystals are generated in the mullite particles, in addition to the mullite crystals. The mullite particles used in the present invention contain 40–86 wt. % alumina, and therefore, the mullite crystals used in the present invention will include alumina and/or silica crystals to a certain corresponding extent.

The mullite particles used in the present invention are non-spherical, and so it is difficult to express the size thereof by the diameter. Therefore, the "mean diameter" with respect to the mullite particles described in the present specification is the conventional equivalent, corresponding to the diameter of a particle having the same volume as such an irregular mullite particle.

BRIEF DESCRIPTION OF THE DRAWINGS

In the accompanying drawings.

DESCRIPTION OF THE PREFERRED EMBODIMENTS

In the following, the present invention will be described in detail with respect to preferred embodiments.

Embodiment 1

Ceramic fibers F1–F5 such as shown in Table 1 and ceramic particles P1-P7 such as shown in Table 2 had been prepared, and, according to the art of vacuum molding, preforms were produced from those fibers or a uniform mixture of those fibers and particles, with colloidal silica being added as a binder, to have such volumetric percentages of the fibers and the particles as shown in Table 3, wherein the preforms had a shape of 100×100×20 mm, with the fibers being randomly oriented with respect to two dimensions in a plane of 100×100 mm.

Figure 8:
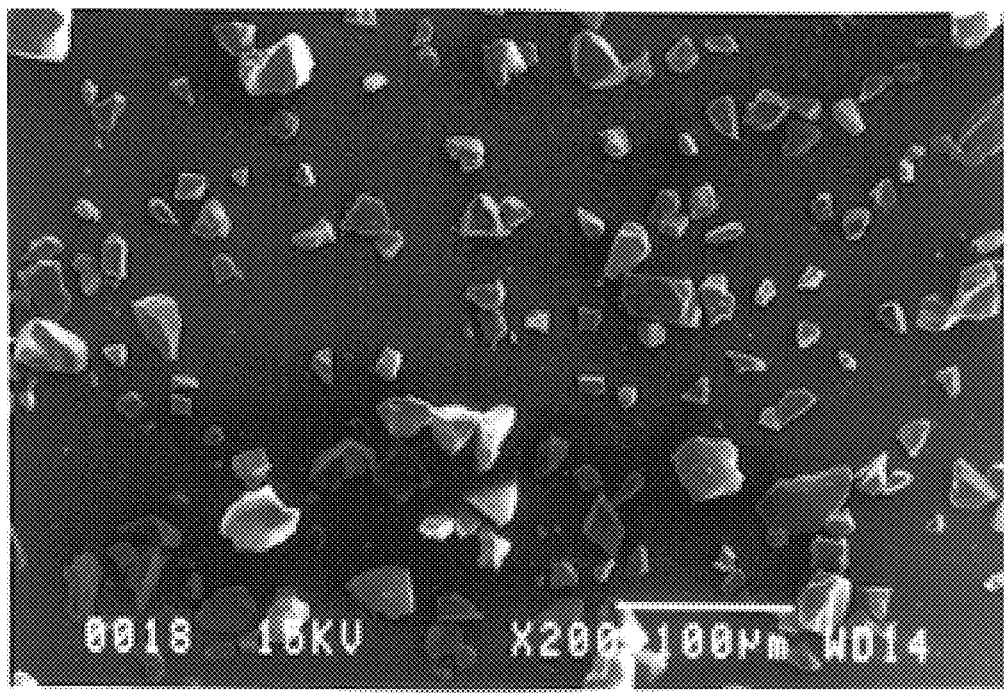
FIG. 8 is an electro-microscopic photograph showing, in 140 times magnification, the structure of the non-spherical mullite particles used in Embodiment 1.

In this connection, FIG. 8 is a microscopic photograph of the non-spherical mullite particles listed as P7 in Table 2, obtained by a scanning type electronic microscope, and showing the particles by 140 times magnification. As will be understood from this photograph, the non-spherical mullite particles have angular shapes bordered by flat torn off surfaces.

Figure 9:
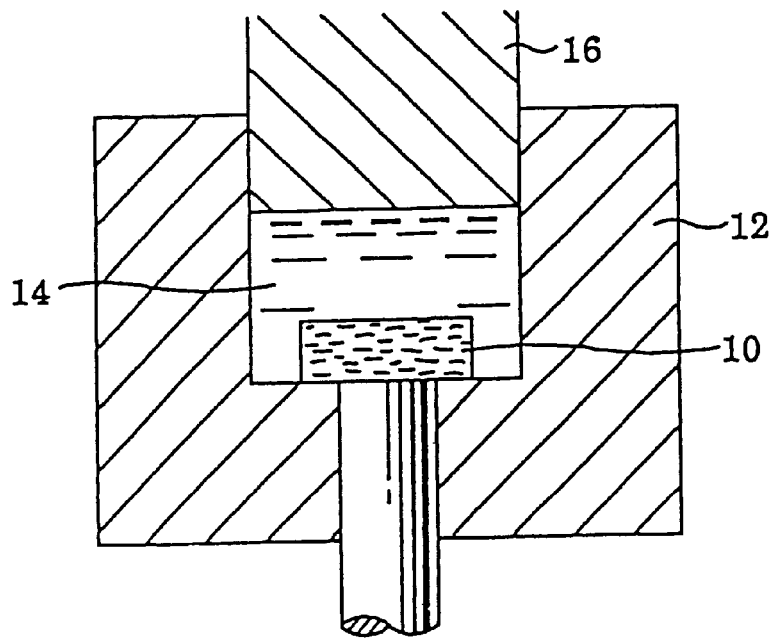
FIG. 9 is a diagrammatic view illustrating the high pressure molding process for manufacturing the composite materials.

Each of the preforms, having been preheated up to approximately 450° C. for about 30 minutes, was placed in a high pressure casting mold 12 warmed up to 250° C. as shown by 10 in FIG. 9, and immediately thereafter a molten aluminum alloy (JIS ADC12) of about 700° C. was poured into the mold as shown by 14, and then the molten alloy 14 was pressurized by a plunger 16 up to about 850 kg/cm$^2$. The pressurized condition was maintained until the molten alloy solidified. After the molten alloy has completely solidified, the solidified body was taken out from the mold and cut to produce a test piece having a shape of elongated plate such as 95×20×5 mm and comprising a composite structure in which the aluminum alloy was reinforced by the ceramic fibers or a combination of the ceramic fibers and particles.

Such a series of test piece composite materials M1–M6 are shown in Table 3 with the volumetric percentages of the fibers and/or the particles.

Figure 10:
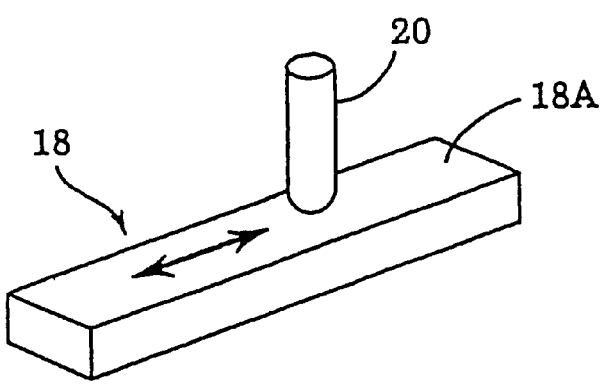
FIG. 10 is a diagrammatic view illustrating the manner of the wearing test by reciprocation.

On the other hand, a pin was prepared from a nitriding stainless steel (JIS SUS440B) conventionally used for the piston rings of the engines, to have a diameter of 5 mm and a length of 15 mm with a hemispherically rounded tip. Then, as shown in FIG. 10, the hemispherically rounded tip of the pin 20 was pressed against a plane surface 18A of 95×20 mm of each test piece 18 under the pressing force of 3 kg, and the two members were relatively reciprocated for a stoke of 50 mm at a cycle of 5 Hz, to test the wearing performance. For the purpose of comparison, a similar wearing test was carried out by using a piece of 95×20×5 mm made of a cast iron (JIS FC250) conventionally used for the cylinder sleeves of engines or the like. The results of the wearing tests are shown in FIG. 1.

Figure 1:
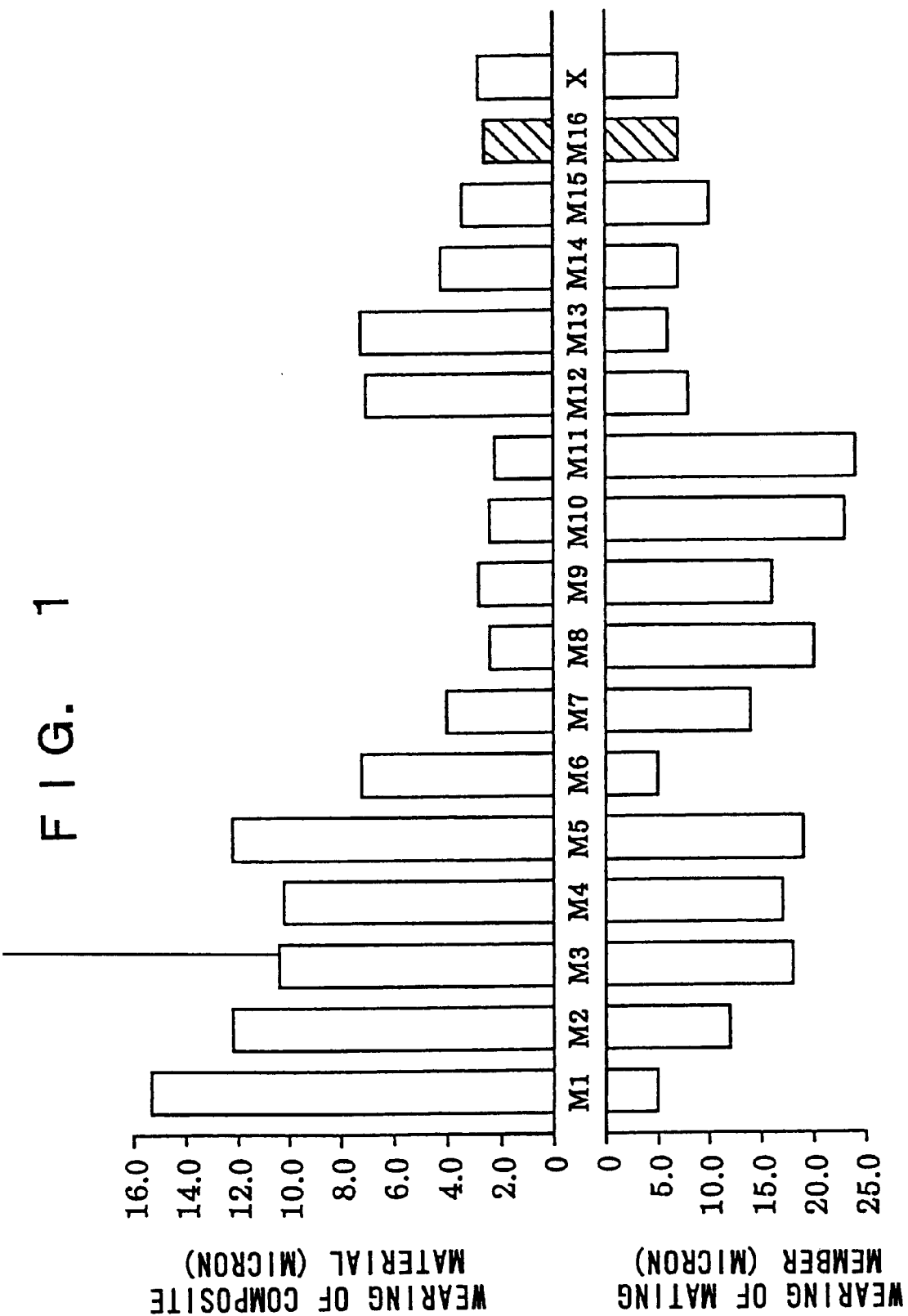
FIG. 1 is a graph showing the results of the wearing tests with respect to various composite materials and cast iron frictionally reciprocated relative to a mating member made of nitriding stainless steel.

As will be understood from FIG. 1, the composite materials M1–M3 reinforced by the alumina-silica short fibers (F1) are, even when the fiber content is so high as 20 vol. % (M3), much inferior to cast iron (X) in the anti-wearing performance; the composite material M4 reinforced by the zirconia short fibers (F2) and the composite material M5 reinforced by the alumina-silica-boria short fibers (F3) are also inferior to cast iron in the anti-wearing performance; and with respect to the composite materials M2–M5, the wearing of the pin, mating member, is also high.

In the composite materials M6–M8 reinforced by the alumina short fibers (F5), although the anti-wearing performance of the composite material is improved according to increase of the volumetric percentage of the alumina short fibers, the wearing of the mating member also increases. Particularly with respect to the composite material M8, although the composite material has an anti-wearing performance comparable with cast iron X, the wearing of the mating member is very high. Similarly, although the composite material M9 reinforced by the alumina short fibers (F5) and the carbon fibers (F4) has an anti-wearing performance comparable with cast iron X, the wearing of the mating member is high. Therefore, if the cylinder bore of the engine is made of these composite materials, to operate with a piston ring made of the nitriding stainless steel, the piton ring will wear soon, causing an increase of engine oil consumption.

The composite material M10 reinforced by the alumina short fibers (F5) and the silicon carbide particles (P1) and the composite material M11 reinforced by the alumina short fibers and the chrome particles (P2) are both sufficient in the anti-wearing performance, but these composite materials are highly abrasive to the mating member. The composite material M12 reinforced by the alumina short fibers (F5) and the silica particles (P3) and the composite material M13 reinforced by the alumina short fibers (F5) and the zirconia-silica particles (P4) are both insufficient in the anti-wearing performance. The composite material M14 reinforced by the alumina short fibers (F5) and the silicon particles (P5) is slightly inferior to cast iron in the anti-wearing performance.

The composite material M15 reinforced by the alumina short fibers (F5) and the spherical mullite particles (P6) is insufficient in the anti-wearing performance and is nevertheless relatively abrasive to the mating member. The reason for this composite material being insufficient in the anti-wearing performance of itself and being nevertheless relatively abrasive to the mating member is in that the mullite particles are spherical and are apt to drop off from the matrix, such dropped off mullite particles causing the wearing of both the composite material and the mating member.

As compared with those described above, the embodiment of the present invention, i.e. the composite material M16, reinforced by the alumina short fibers (F5) and the non-spherical mullite particles (P7) has a superior anti-wearing performance comparable with cast iron, and also shows a low abrasiveness to the mating member comparable with cast iron. The reason for the composite material according to the present invention being superior in both the anti-wearing performance of itself and the abrasiveness to the mating member is in that the mullite particles are non-spherical and hardly drop off from the matrix of the composite material.

Embodiment 2

Since the hardness of the alumina short fibers varies according to the alpha alumina content, it was contemplated that the anti-wearing performance and the abrasiveness to the mating member of the composite material reinforced by the alumina short fibers and the non-spherical mullite particles will be influenced by the alpha alumina content. Therefore, it was investigated what range of the alpha alumina content is desirable for the alumina short fibers in the slide member of the composite material according to the present invention.

As shown in Table 4, eight composite materials MA1–MA8 were prepared such that the matrix of an aluminum alloy (JIS ADC12) was reinforced by 5 vol. % alumina short fibers (97 wt. % $Al_2O_3$—3 wt. % $SiO_2$, 3 microns mean diameter, 60 microns mean length) and 10 vol. % non-spherical mullite particles (72 wt. % $Al_2O_3$—28 wt. % $SiO_2$, 25 microns mean diameter), wherein the alpha alumina content of the alumina short fibers was varied to eight different levels as shown in the table. Then, test plate pieces were cut out from these composite materials to have the same dimensions as in Embodiment 1, and the wearing tests were carried out with respect to those test pieces in the same manner as in Embodiment 1. The results are shown in FIG. 2.

Figure 2:
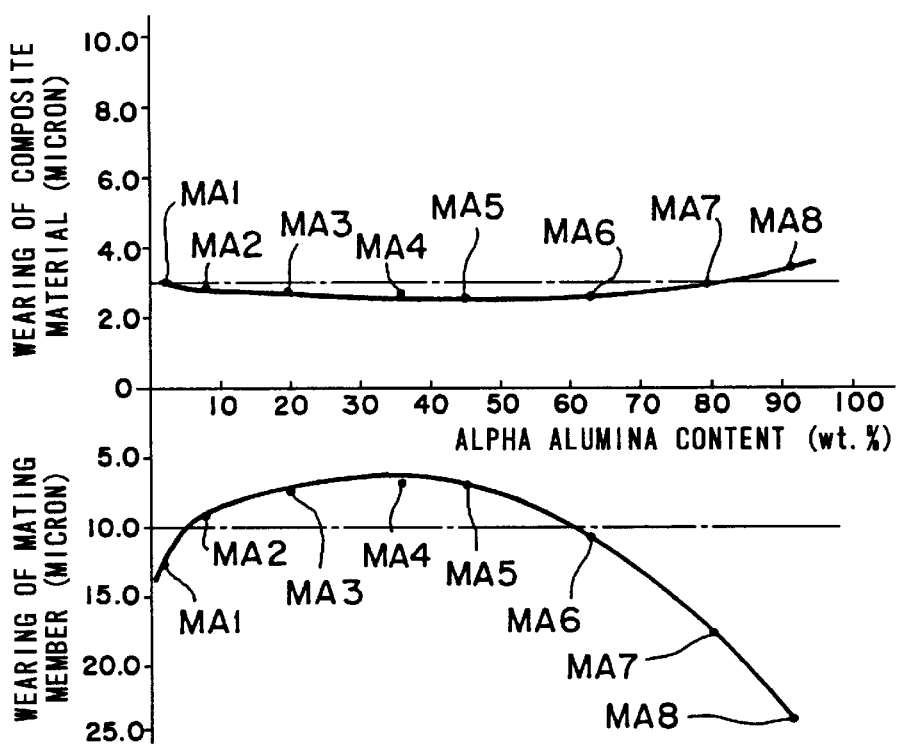
FIG. 2 is a graph showing the relation between the alpha alumina content of the alumina short fibers and the wearing of the composite materials and the mating member.

From FIG. 2, it will be understood that, when the alpha alumina content of the alumina short fibers is in a range of about 2–85 wt. %, the wearing of the composite material is kept to be lower than a target wearing (shown by a phantom line in FIG. 2; the same in the below-mentioned FIGS. 3–6) obtained by the actual engine evaluation test. On the other hand, the wearing of the pin, mating member, is kept to be lower than the target wearing when the alpha alumina content is in a range of about 5–60 wt. %. Therefore, in order to keep the wearing of the composite material itself and also the wearing of the mating member to be desirably low, the alpha alumina content of the alumina short fibers in the slide member according to the present invention should be maintained in a range of 5–60 wt. %.

Embodiment 3

Since the hardness of the mullite particles varies according to the alumina content thereof, it was contemplated that the alumina content of the mullite particles will influence the anti-wearing performance and the abrasiveness to the mating member of the composite material. Therefore, it was investigated what range of the alumina content is desirable for the mullite particles in the slide member of the composite material according to the present invention.

As shown in Table 5, seven composite materials MB1–MB7 were prepared such that the matrix of an aluminum alloy (JIS ADC12) was reinforced by 5 vol. % alumina short fibers (97 wt. % $Al_2O_3$—3 wt. % $SiO_2$, 32 wt. % alpha alumina content, 3 microns mean diameter, 60 microns mean length) and 10 vol. % non-spherical mullite particles (28 microns mean diameter), wherein the alumina content of the mullite particles was varied to seven different levels as shown in the table. Then, test plate pieces were cut out from these composite materials to have the same dimensions as in Embodiment 1, and the wearing tests were carried out with respect to those test pieces in the same manner as in Embodiment 1. The results are shown in FIG. 3.

Figure 3:
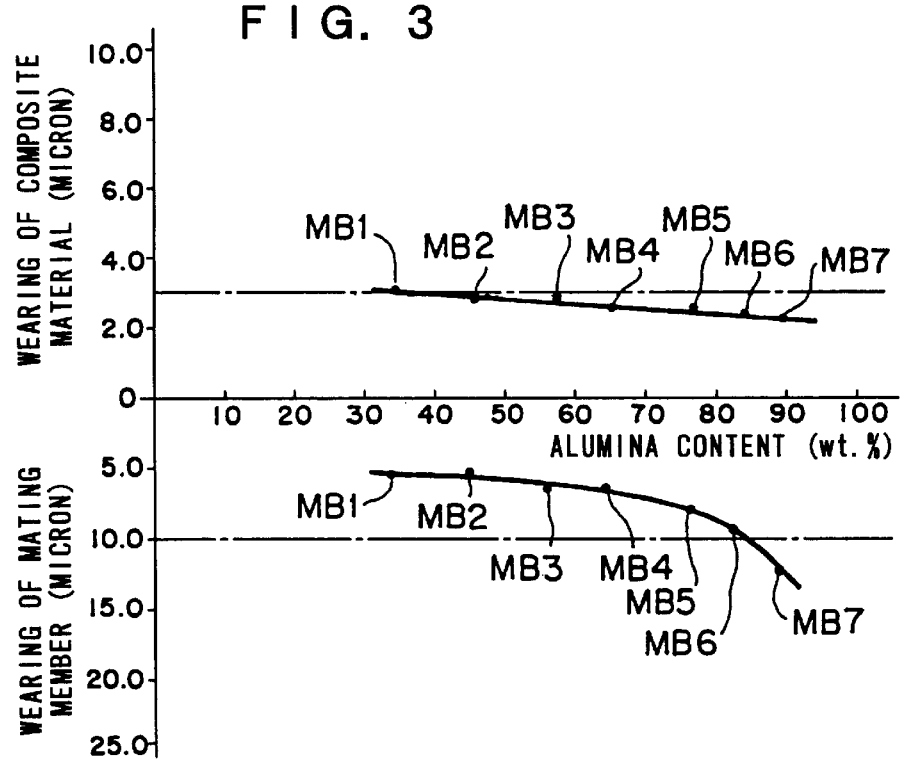
FIG. 3 is a graph showing the relation between the alumina content of the non-spherical mullite particles and the wearing of the composite materials and the mating member.

From FIG. 3, it will be understood that the wearing of the composite material is kept to be lower than the target wearing amount when the alumina content of the mullite particles is not less than about 40 wt. %. On the other hand, the wearing of the pin, mating member, is kept to be lower than the target wearing when the alumina content of the mullite is not more than about 86 wt. %. Therefore, in order to keep the wearing of the composite material itself and also the wearing of the mating member to be desirably low, the alumina content of the mullite particles in the slide member according to the present invention should be maintained in a range of 40–86 wt. %.

Embodiment 4

Since it was contemplated that the size of the mullite particles will influence the anti-wearing performance of the composite material reinforced by the alumina short fibers and the non-spherical mullite particles, it was investigated what range of the mean diameter is desirable for the mullite particles in the slide member of the composite material according to the present invention.

As shown in Table 6, eight composite materials MC1–MC8 were prepared such that the matrix of an aluminum alloy (JIS ADC12) was reinforced by 5 vol. % alumina short fibers (95 wt. % $Al_2O_3$—5 wt. % $SiO_2$, 36 wt. % alpha alumina content, 3 microns mean diameter, 60 microns mean length) and 10 vol. % non-spherical mullite particles (79 wt. % $Al_2O_3$—21 wt. % $SiO_2$), wherein the mean diameter of the mullite particles was varied to eight different sizes as shown in the table. Then, test plate pieces were cut out from these composite materials to have the same dimensions as in Embodiment 1, and the wearing tests were carried out with respect to those test pieces in the same manner as in Embodiment 1. The results are shown in FIG. 4.

Figure 4:
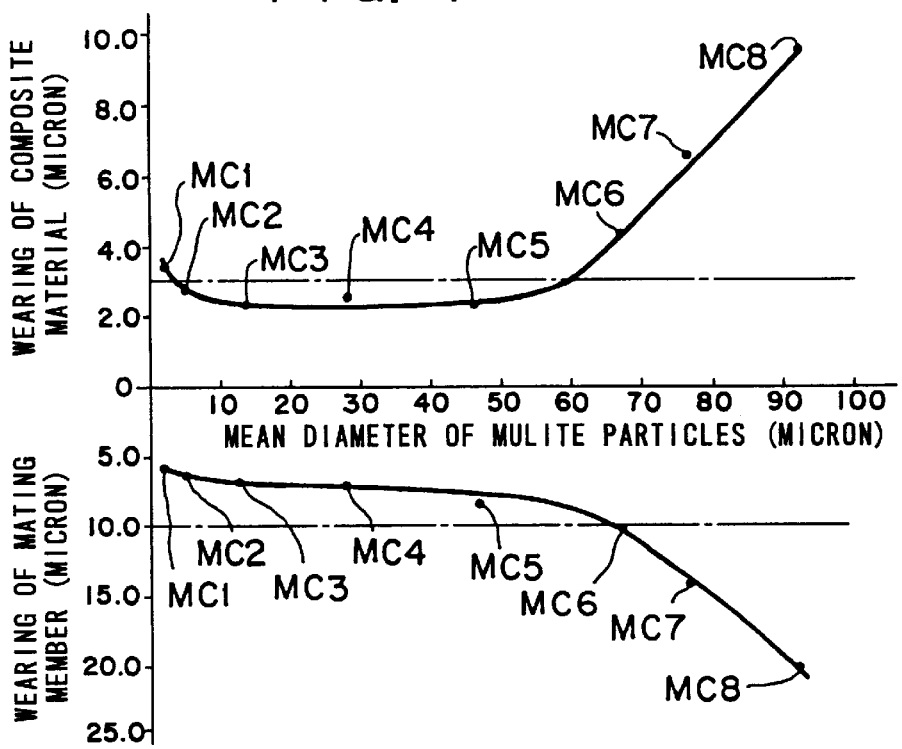
FIG. 4 is a graph showing the relation between the mean diameter of the non-spherical mullite particles and the wearing of the composite materials and the mating member.

From FIG. 4, it will be understood that the wearing of the composite material is kept to be lower than the target wearing when the mean diameter of the mullite particles is in a range of about 3–60 microns. On the other hand, the wearing of the pin, mating member, is kept to be lower than the target wearing when the mean diameter of the mullite particles is not more than about 65 microns. Therefore, in order to keep the wearing of the composite material itself and also the wearing of the mating member to be desirably low, the mean diameter of the mullite particles in the slide member according to the present invention should be maintained in a range of 3–60 microns.

A series of similar wearing tests were carried out with respect to the similar composite materials by changing the mean diameter and the mean length of the alumina short fibers to observe the changes in the ant-wearing performance and the abrasiveness to the mating member of the composite material. As a result, it was noted that the ant-wearing performance and the abrasiveness to the mating member of the composite material change little according to the mean diameter and the mean length of the alumina short fibers. Therefore, it was confirmed that the mean diameter and the mean length of the alumina short fibers need not be particularly specified.

Embodiment 5

Since it was contemplated that the volumetric percentages of the alumina short fibers and the non-spherical mullite particles will influence the anti-wearing performance and the abrasiveness to the mating member of the composite material reinforced by the alumina short fibers and the non-spherical mullite particles, it was investigated what ranges of the volumetric percentage are desirable for the alumina short fibers and the non-spherical mullite particles in the slide member of the composite material according to the present invention.

As shown in Table 7, five composite materials MY1–MY5 were prepared such that the matrix of an aluminum alloy (JIS ADC12) was reinforced only by the same alumina short fibers as used in Embodiment 4, wherein the volumetric percentage of the alumina short fibers was varied to five different levels as shown in the table. Then, test plate pieces were cut out from these composite materials to have the same dimensions as in Embodiment 1, and the wearing tests were carried out with respect to those test pieces in the same manner as in Embodiment 1. The results are shown in FIG. 5.

Figure 5:
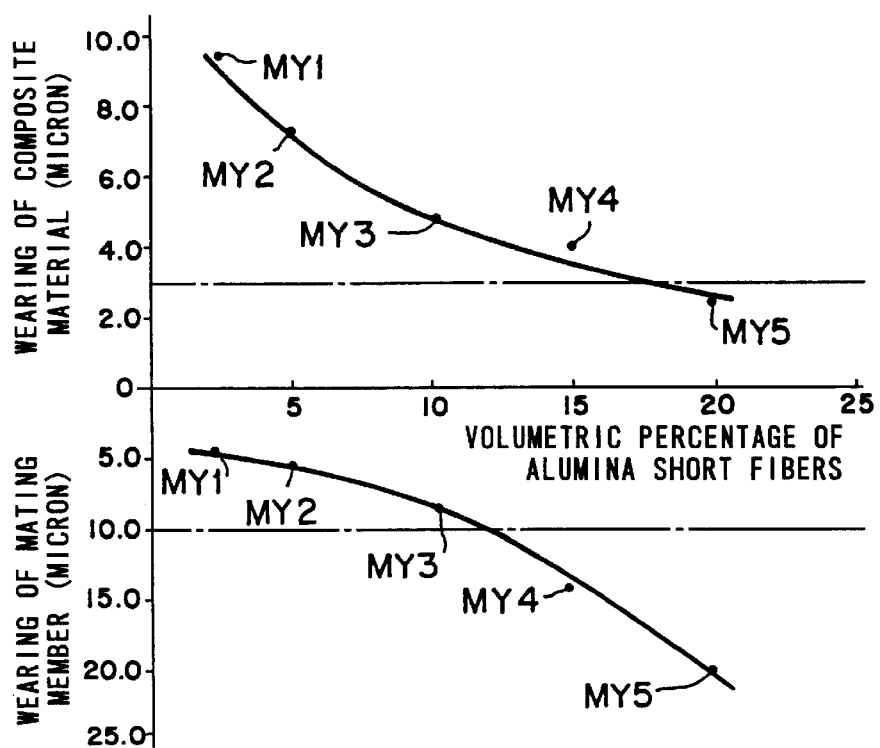
FIG. 5 is a graph showing the relation between the volumetric percentage of the alumina short fibers and the wearing of the composite materials and the mating member.

From FIG. 5, it will be understood that the wearing of the pin, mating member, is kept to be lower than the target wearing obtained from the actual engine evaluation test when the volumetric percentage of the alumina short fibers is not higher than about 12%. On the other hand, in order to produce a reinforcing preform from a mixture of alumina short fibers and mullite particles by the vacuum molding or the pressure molding, it is necessary that the volumetric percentage of the alumina short fibers is substantially not less than 2 vol. %. Therefore, the volumetric percentage of the alumina short fibers in the slide member according to the present invention needs to be in a range of 2–12 vol. %.

In view of the results of the above-mentioned wearing tests, five composite materials MD1–MD5 were prepared such that the matrix of an aluminum alloy (JIS ADC12) was reinforced by 2 vol. % alumina short fibers (95 wt. % $Al_2O_3$—5 wt. % $SiO_2$, 36 wt. % alpha alumina content, 3 microns mean diameter, 60 microns mean length) and such volumetric percentages of non-spherical mullite particles (79 wt. % $Al_2O_3$—21 wt. % $SiO_2$, 30.6 microns mean diameter) as shown in Table 8, and also five composite materials ME1–ME5 were prepared such that the matrix of an aluminum alloy (JIS ADC12) was reinforced by 12 vol. % of the same alumina short fibers and such volumetric percentages of the same non-spherical mullite particles as shown in Table 9. Then, test plate pieces were cut out from these composite materials to have the same dimensions as in Embodiment 1, and the wearing tests were carried out with respect to those test pieces in the same manner as in Embodiment 1. The results are shown in FIG. 6.

Figure 6:
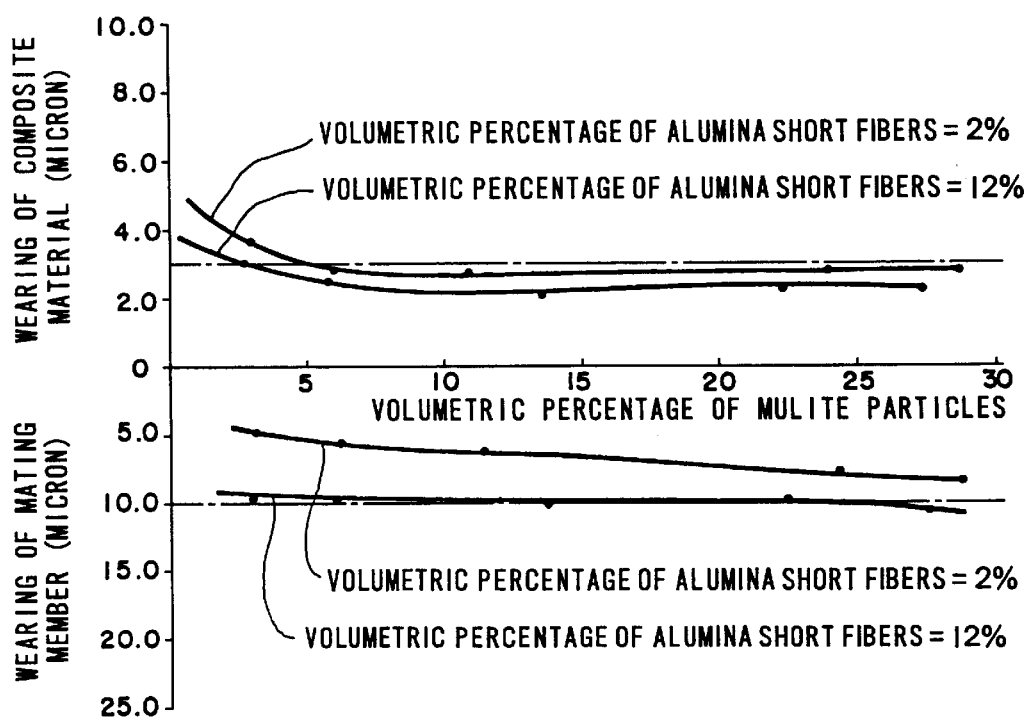
FIG. 6 is a graph showing the relation between the volumetric percentage of the non-spherical mullite particles and the wearing of the composite materials and the mating member when the volumetric percentage of the alumina short fibers is 2% and 12%.

From FIG. 6, it will be understood that the wearing of the composite material is kept to be lower than the target wearing when the volumetric percentage of the mullite is not less than about 5% if the volumetric percentage of the alumina short fibers is 2%, while the wearing of the composite material is kept to be lower than the target wearing when the volumetric percentage of the mullite is not less than about 3% if the volumetric percentage of the alumina short fibers is 12%. On the other hand, the wearing of the pin, mating member, is kept to be lower than the target wearing regardless of the volumetric percentage of the mullite particles if the volumetric percentage of the alumina short fibers is 2%, while the wearing of the pin, mating member, is kept to be lower than the target wearing when the volumetric percentage of the mullite particles is not higher than about 25% if the volumetric percentage of the alumina short fibers is 12%. Therefore, in order to decrease the wearing of the composite material itself and also the wearing of the mating member, the volumetric percentages of the alumina short fibers and the non-spherical mullite particles in the slide member of the composite material according to the present invention should be maintained in ranges of 2–12 and 5–25 wt. %, respectively.

Embodiment 6

Since it was known from the above Embodiment 5 that the volumetric percentages of the alumina short fibers and the non-spherical mullite particles should desirably be 2–12% and 5–20%, respectively, it was investigated in what range the total volumetric percentage of the alumina short fibers and the mullite particles should desirably be.

Nine preforms F1–F9, each having 10 mm outer diameter, 80 mm inner diameter and 120 mm length, of the reinforcing material were prepared by uniformly mixing alumina short fibers (97 wt. % $Al_2O_3$—3 wt. % $SiO_2$, 32 wt. % alpha alumina content, 3 microns mean diameter, 60 microns mean length) and non-spherical mullite particles (78 wt. % $Al_2O_3$—22 wt. % $SiO_2$, 29.4 microns mean diameter) at such volumetric percentages as shown in Table 10, with colloidal silica being added as a binding agent, and drawing the mixtures under vacuum, wherein the alumina short fibers were randomly oriented in two dimensions along a cylindrical surface.

Then, by using these preforms, composite material MF1–MF9 having the same shape and size as the preforms were produced according to the pressure molding in the same manner as in the above-mentioned embodiments such that each of the preform was infiltrated with the matrix of aluminum alloy (JIS ADC12). The inner cylindrical surfaces of the composite materials were finished by boring and horning processes in the same manner as in the actual engine cylinders. Then, test pieces were cut out therefrom to have a length of 60 mm along the axis of the cylinder and a width of 40 mm along the circumference of the cylinder.

After the circumferentially inside surface of each such test piece had been wetted with a small amount of a lubricant (Castle Motor Oil 10W-40), a piston ring made of a nitriding stainless steel (JIS SUS440B) was pressed thereon at a load of 3 kg and reciprocated relative to the test piece in the axial directions thereof for a stoke of 30 mm at a speed of 30 mm/sec in the atmosphere of 100° C., to test the scuffing performance. The scuffing test was carried out such that the time was counted from the start of the reciprocation until a scar was generated on the test surface due to an increase of the friction coefficient. The test results are shown in FIG. 7, wherein the ordinate represents the time counts, while the abscissa represents the total volumetric percentage of the alumina short fibers and the mullite particles.

Figure 7:
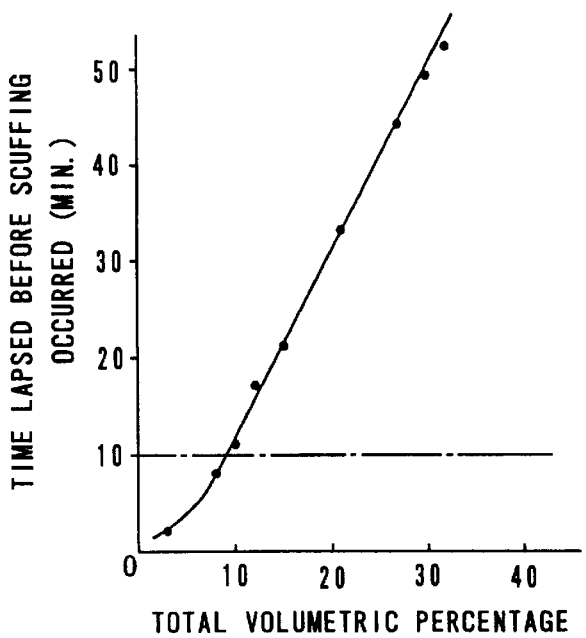
FIG. 7 is a graph showing the relation between the total volumetric percentage of the alumina short fibers and the non-spherical mullite particles and the time lapsed before the scuffing occurs.

From FIG. 7, it will be understood that the time to lapse before a scuffing occurs gradually increases according to increase of the total volumetric percentage of the alumina short fibers and the mullite particles such that a target time such as 10 minutes obtained from the actual engine evaluation test is accomplished when said total volumetric percentage is not less than about 9%. Therefore, said total volumetric percentage should desirably be not less than 9%.

Embodiment 7

In order to confirm the effects of the present invention in an actual engine, the slide member according to the present invention was incorporated into the cylinder bore of an actual engine in the following manner, and the engine was tested for a continuous duration.

Cylindrical reinforcing preforms having an outer diameter of 82 mm, an inner diameter of 73 mm and a length of 150 mm were prepared from the alumina short fibers and the non-spherical mullite particles mixed at such volumetric percentages as shown in Table 11. Then, after having been heated to a temperature of about 400° C. for 30 minutes in an electric furnace, the reinforcing preforms were each set to a core for forming a cylinder bore of a horizontal die casting mold adapted to cast a cylinder block of a four cylinder engine of a total displacement of 1600 cc, and a cylinder block was cast.

Two of the preforms of type G1 were set to the cores for forming the cylinder bores of first and third cylinders, while two of the preforms of type G2 were set to the cores for forming the cylinder bores of second and fourth cylinders. The aluminum alloy (JIS ADC12) was heated to 630° C., and infiltrated into the preforms under pressure, such that the cylinder bores were each reinforced by a layer of a composite material comprising the alumina short fibers and the non-spherical mullite particles.

The cylinder block thus molded was finished by the required machining processes, and the cylinder heads, pistons and other engine parts were assembled thereto. The engine thus assembled was operated at 6000 rpm for 200 hours to test its continuous duration performance.

After the test operation, the engine was disassembled, and the wearing of a portion of the cylinder bore stroked by the top ring of the piston was measured. The wearing of said portions of the first and third cylinders reinforced by the preforms G1 was 2.2 microns, and the wearing of said portions of the second and fourth cylinders reinforced by the preforms G2 was 2.0 microns. The wearing of the piston ring was also small. Thus, it was confirmed that the cylinder bore constructed according to this embodiment of the present invention is practically of no problem in its anti-wearing performance and its abrasiveness to a mating member.

show no practical problem with respect to the anti-scuffing performance even when the engine is operated at a very low temperature such as −15° C.

It was confirmed that substantially the same results are available when the aluminum alloy in the above-mentioned various embodiments, i.e. JIS ADC12, is replaced by other similar aluminum alloys such as JIS ADC10, JIS AC4C or the like. It was also confirmed that substantially the same results are available when the alumina short fibers in the above-mentioned various embodiments are replaced by alumina short fibers consisting of 80 wt. % $Al_2O_3$ and 20 wt. % $SiO_2$ manufactured by Denki Kagaku Kogyo K. K. Further, it was confirmed that substantially the same results are available when the alumina short fibers are randomly oriented in three dimensions or randomly oriented in two dimensions along a plane perpendicular to the sliding surface.

Although the present invention has been described in the above with respect to some particular embodiments thereof, it will be apparent for those skilled in the art that other various embodiments are possible within the scope of the present invention.

As will be apparent from the foregoing descriptions, the slide member constructed according to the present invention as defined by claim 1 shows an improved performance in its anti-wearing performance and also in its abrasiveness to a mating member as compared with the conventional slide member reinforced by a combination of alumina short fibers and carbon fibers, with simultaneous reduction of its manufacturing costs.

Further, when the present invention is embodied as defined by claim 2, the slide member is constructed so as not only to provide improvements in its anti-wearing performance and its abrasiveness to a mating member but also to improve its anti-scuffing performance, with simultaneous reduction of its manufacturing costs.

TABLE 1

| Symbol | Fibers (chemical comp.) | Mean dia. (microns) | Mean leng. (microns) | Manufacturer (trademark) |
| --- | --- | --- | --- | --- |
| F1 | alumina-silica short fibers (Note 1) | 2–3 | 60 | Isolite Kogyo K.K. (Arsiron) |
| F2 | zirconia short fibers ($ZrO_2$) | 3–5 | 60 | Shinagawa-haku-renga K.K. (Y7Z) |
| F3 | alumina-silica-boria short fibers (Note 2) | 12 | 5 | Sumitomo-3M K.K. (Nextel) |
| F4 | carbon short fibers (C) | 7 | 2 | Toray K.K. (T300) |
| F5 | alumina short fibers (Note 3) | 3 | 60 | ICI (Saffil) |

Note 1: 50% $Al_2O_3$ - 50% $SiO_2$, with 61 wt. % mullite crystal content
Note 2: $Al_2O_3$ - 24% $SiO_2$ - 14% $B_2O_3$
Note 3: 95% $Al_2O_3$ - 5% $SiO_2$, with 35 wt. % alpha alumina content Embodiment 8

A cylinder block constructed according to the same process as in Embodiment 7 was assembled in an engine, and the engine was operated in an atmosphere of −15° C. in such a cyclic manner that its rotation speed was raised from 3000 rpm to 6000 rpm and immediately thereafter lowered to 3000 rpm to make one cycle of a duration of 3 seconds, such a cycle having been repeated 70 times. As a result of such a cyclic operation, it was confirmed that the cylinder bores

TABLE 2

| Symbol | Particles (chemical comp.) | Mean dia. (microns) | Manufacturer (trademark) |
| --- | --- | --- | --- |
| P1 | silicon carbide (SiC) | 30 | Showa Denko K.K. (Greendensic) |
| P2 | chrome carbide ($Cr_3C_2$) | 30 | Showa Denko K.K. |

TABLE 2-continued

| Symbol | Particles (chemical comp.) | Mean dia. (microns) | Manufacturer (trademark) |
|---|---|---|---|
| P3 | silica (SiO$_2$) | 30 | Showa Denko K.K. |
| P4 | zirconia-silica (ZrO$_2$ - 33% SiO$_2$) | 30 | Showa Denko K.K. |
| P5 | silicon (Si) | 30 | |
| P6 | spherical mullite (Note 1) | 30 | Isolite Kogyo K.K. |
| P7 | non-spherical mullite (Note 2) | 30 | Showa Denko K.K. |

Note 1: 50% Al$_2$O$_3$ - 50% SiO$_2$
Note 2: 76% Al$_2$O$_3$ - 24% SiO$_2$

TABLE 3

| Symbol | Fibers (vol. %) | Particles (vol. %) |
|---|---|---|
| M1 | F1 (7) | — |
| M2 | F1 (15) | — |
| M3 | F1 (20) | — |
| M4 | F2 (15) | — |
| M5 | F3 (15) | — |
| M6 | F5 (5) | — |
| M7 | F5 (15) | — |
| M8 | FS (20) | — |
| M9 | F5 (17) + F4 (6) | — |
| M10 | F5 (5) | P1 (10) |
| M11 | F5 (5) | P2 (10) |
| M12 | F5 (5) | P3 (10) |
| M13 | F5 (5) | P4 (10) |
| M14 | F5 (5) | P5 (10) |
| M15 | F5 (5) | P6 (10) |
| M16 | F5 (5) | P7 (10) |

TABLE 4

| Symbol | alpha alumina content (wt. %) | Symbol of composite material |
|---|---|---|
| A1 | 2.0 | MA1 |
| A2 | 8.0 | MA2 |
| A3 | 20.0 | MA3 |
| A4 | 36.0 | MA4 |
| A5 | 45.0 | MA5 |
| A6 | 63.0 | MA6 |
| A7 | 80.0 | MA7 |
| A8 | 92.0 | MA8 |

TABLE 5

| Symbol | alumina content (wt.%) | Symbol of composite material |
|---|---|---|
| B1 | 34.0 | MB1 |
| B2 | 45.0 | MB2 |
| B3 | 56.4 | MB3 |
| B4 | 64.5 | MB4 |
| B5 | 76.2 | MB5 |
| B6 | 82.7 | MB6 |
| B7 | 89.5 | MB7 |

TABLE 6

| Symbol | Mean diameter (micron) | Symbol of composite material |
|---|---|---|
| C1 | 1.3 | MC1 |
| C2 | 5.1 | MC2 |
| C3 | 12.7 | MC3 |
| C4 | 27.9 | MC4 |
| C5 | 46.6 | MC5 |
| C6 | 67.4 | MC6 |
| C7 | 77.0 | MC7 |
| C8 | 92.4 | MC8 |

TABLE 7

| Symbol | Volumetric percentage of fibers | Symbol of composite material |
|---|---|---|
| Y1 | 2.3 | MY1 |
| Y2 | 5.0 | MY2 |
| Y3 | 10.2 | MY3 |
| Y4 | 15.0 | MY4 |
| Y5 | 20.0 | MY5 |

TABLE 8

| Symbol | Volumetric percentage of particles | Symbol of comnposite material |
|---|---|---|
| D1 | 3.1 | MD1 |
| D2 | 6.2 | MD2 |
| D3 | 11.6 | MD3 |
| D4 | 24.2 | MD4 |
| D5 | 28.9 | MD5 |

TABLE 9

| Symbol | Volumetric percentage of particles | Symbol of composite material |
|---|---|---|
| E1 | 2.9 | ME1 |
| E2 | 6.0 | ME2 |
| E3 | 13.7 | ME3 |
| E4 | 22.5 | ME4 |
| E5 | 27.6 | ME5 |

TABLE 10

| Symbol | Fiber | Particle (vol. %) | Total | Symbol of composite material |
|---|---|---|---|---|
| E1 | 2 | 5 | 7 | MF1 |
| E2 | 2 | 6 | 8 | MF2 |
| E3 | 4 | 6 | 10 | MF3 |
| E4 | 3 | 9 | 12 | MF4 |
| E5 | 5 | 10 | 15 | MF5 |
| E6 | 10 | 11 | 21 | MF6 |
| E7 | 5 | 22 | 27 | MF7 |
| E8 | 9 | 21 | 30 | MF8 |
| E9 | 12 | 20 | 32 | MF9 |

TABLE 11

| Symbol | Fiber | Particle (vol. %) | Total | Symbol of composite material |
|---|---|---|---|---|
| G1 | 5 | 10 | 15 | MG1 |
| G2 | 7 | 15 | 22 | MG2 |

What is claimed is:

1. A slide member made of an aluminum alloy and compositely reinforced at a sliding surface portion thereof by a reinforcing material, wherein said reinforcing material comprises a mixture of alumina short fibers consisting of not less than 80 wt. % alumina and the remainder silica and having 5–60 wt. % alpha alumina content, and irregular non-spherical mullite particles consisting of 40–86 wt. % alumina and the remainder silica and having 3–60 microns mean diameter, the volumetric percentages of said alumina short fibers and said mullite particles being 2–12% and 5–25%, respectively, on the basis of the volume of the reinforced portion.

2. A slide member according to claim 1, wherein the total volumetric percentage of said alumina short fibers and said mullite particles is not less than 9%.

* * * * *